United States Patent [19]

Schaefer

[11] 4,384,749
[45] May 24, 1983

[54] RELIABILITY ROLLER BEARING

[75] Inventor: James R. Schaefer, Juno Isles, Fla.

[73] Assignee: The United States of America as represented by the Secretary of the Air Force, Washington, D.C.

[21] Appl. No.: 277,489

[22] Filed: Jun. 26, 1981

[51] Int. Cl.³ .................. F16C 33/66; F16C 33/58
[52] U.S. Cl. ............................ 308/187; 308/207 R; 308/216
[58] Field of Search ............. 308/216, 207 R, 202, 308/240, 244, 187

[56] References Cited

U.S. PATENT DOCUMENTS

| | | | |
|---|---|---|---|
| 2,718,439 | 9/1955 | Glasser et al. | 308/187 |
| 2,838,348 | 6/1958 | Hamm | 308/187 |
| 3,112,417 | 11/1963 | Tamm | 308/187 |
| 3,195,965 | 7/1965 | Van Dorn | 308/187 |
| 3,497,277 | 2/1970 | Malott | 308/187 |
| 3,502,377 | 3/1970 | Schaeffler et al. | 308/212 |
| 3,528,711 | 9/1968 | Atkinson | 308/187 |
| 3,549,222 | 12/1970 | Hansen et al. | 308/187 |
| 3,640,594 | 2/1972 | Aho | 308/212 |
| 3,722,967 | 3/1973 | Lewis | 308/187 |
| 4,334,720 | 6/1982 | Signer | 308/187 |

Primary Examiner—Stuart S. Levy
Assistant Examiner—David Werner
Attorney, Agent, or Firm—Donald J. Singer; Jacob N. Erlich

[57] ABSTRACT

An improved reliability roller bearing having an outer ring; inner ring made up of three separable elements, that is, two guide rails and an inner raceway; a plurality of rollers interposed between the inner ring and the outer ring and a cage for supporting the rollers therebetween. Both guide rails entrap up to 60% of the roller diameter. In addition, the roller bearing incorporates therein a novel lubricant distribution system which is formed within the guide rails. Even distribution of lubricant is obtained by a centrifugally fed weir built into both guide rails.

12 Claims, 4 Drawing Figures

RELIABILITY ROLLER BEARING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to high speed antifriction bearings, and, more particularly, to a roller bearing of improved reliability.

In general, an antifriction bearing of the roller bearing type finds its greatest utility by being interposed between a stationary and a rotating member or two rotating members in order to substantially reduce the friction therebetween. Such a roller bearing generally comprises an inner ring and an outer ring, the inner ring being fixedly secured to a rotating shaft. Situated between the inner ring and outer ring are a plurality of cylindrical rollers. The rollers are generally held in spaced apart relationship by a cage, separator or retainer. As the shaft rotates, the inner ring rotates with respect to the outer ring, with the cage and rollers also rotating. As the speed of the shaft increases, the friction generated by the relative motion between the cage, rollers and rings increases.

Generally, roller bearing reliability has kept up with the state-of-the-art primarily through the tightening of manufacturing tolerances thereby resulting in substantially increased manufacturing costs. As higher speeds and more severe loading and alignment conditions arise the manufacturing limits of roller bearings are being reached.

Experience has shown us that roller instability (eccentric and wear) can occur in bearings at speeds as low as 1 million DN (DN=bearing bore in mm×shaft RPM). At speeds greater than 1 million DN continuous bearing operation requires uniform oil distribution through the bearing in order to reduce wear. The above problems have created unreliability in the use of roller bearings. Therefore, there exists a need to not only provide a roller bearing which is cost efficient but is also capable of overcoming roller instability problems as well as effectively providing uniform lubrication to the moving parts of the bearing.

SUMMARY OF THE INVENTION

The instant invention overcomes the problems encountered in the past by improving the reliability of the cylindrical roller bearing in a cost conscious manner by utilizing a separable three piece inner ring structure in combination with a novel lubricant distribution system.

The present invention is in the form of a roller bearing made up of an outer ring, an inner ring of three separable elements (two guide rails or shoulders and a raceway) which is secured to a rotatable shaft, a plurality of cylindrical rollers interposed between the inner and outer rings and a cage encompassing the rollers. As a result of the construction of the roller bearing of this invention, the cage may be manufactured with much greater flexibility since the inner ring can be separated therefrom. In addition, the guide rails do not have to be made of the same hardness as the inner raceway thereby resulting in lower machining costs.

Furthermore, as part of this invention, the guide rails incorporate therein a unique lubricant distribution system. The lubricant distribution system includes a plurality of radial slots within the guide rails which are interconnected to a circular-shaped or annular channel juxtaposed to the rollers. The channel terminates in a weir having a flat or rounded lip and which is concentric with the bore of the guide rails. A slight taper is applied to the face of the weir which allows for a buildup of pressure at the journal face. Lubrication for the roller bearing may be provided by means of oil jets which target lubricant towards the radial slots. Even distribution of the lubricant is maintained by centrifugal force acting thereon.

Utilization of a three piece inner ring minimizes the effect of roller instability, reduces element end wear and increases the warning time of an imminent bearing problem before the bearing loses its centering capability. In addition, by utilizing separable guide rails, the bearings can be designed with guide rails encompassing as much as 60% of the roller diameter. This arrangement allows sufficient room for designing the weir and damping characteristics while improving the durability of the bearing.

More specifically, under conditions of incipient failure such as spalling or element instability, wear and possibly vibrations will occur prior to catastrophic failure. The bearings high guide rails which contain the rollers offer more time before the cage is fractured and/or eventual loss of shaft centering occurs thereby substantially improving the safety of the bearing while being extremely cost effective.

An alternate embodiment of this invention modifies the method of introducing lubricant into the lubrication system incorporated within the guide rails. In this embodiment, lubricant from an orifice is jetted at the shaft which in turn reflects the lubricant into a plurality of reservoirs. Lubricant from these reservoirs is transferred into the radial slots in the guide rails for appropriate distribution.

It is therefore an object of this invention to provide a roller bearing which substantially improves overall bearing reliability.

It is another object of this invention to provide a roller bearing which overcomes the problems of roller instability and roller wear.

It is still another object of this invention to provide a roller bearing which substantially eliminates the effect of end clearance on roller skew angle.

It is a further object of this invention to provide a roller bearing which substantially eliminates the problem of guide rail runout.

It is still a further object of this invention to provide a roller bearing which substantially improves lubrication of the bearing.

It is still another object of this invention to provide a roller bearing which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 1:
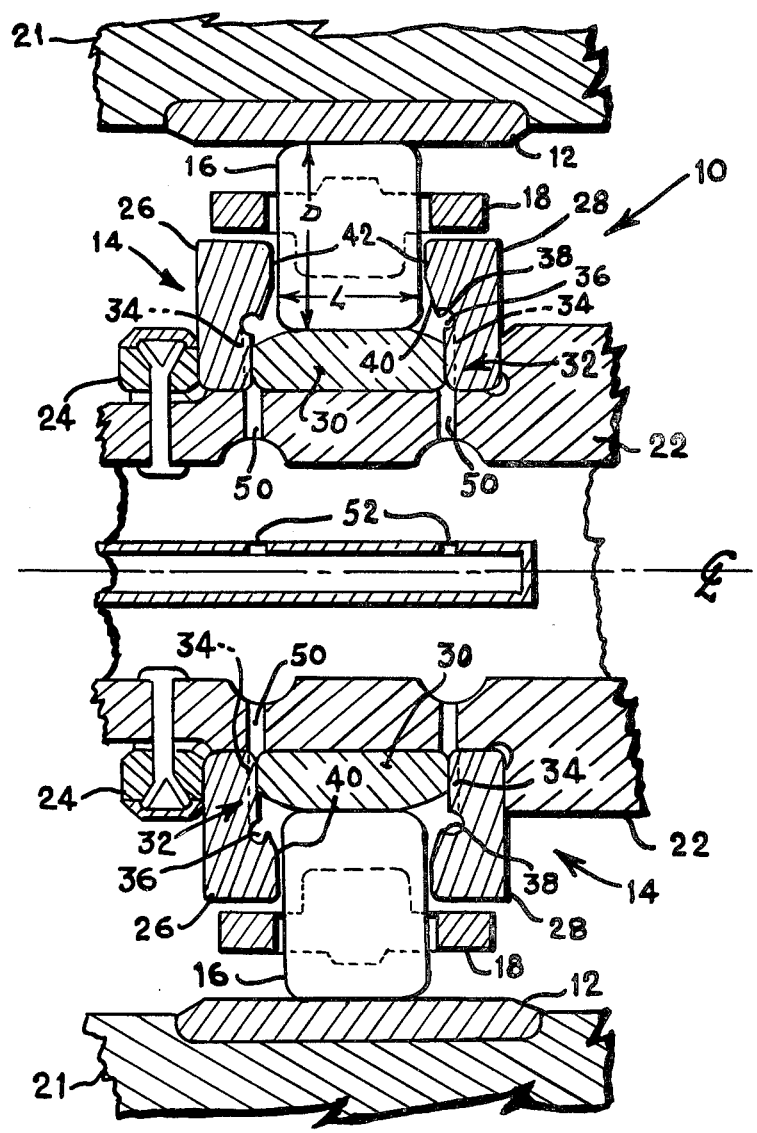
Figure 2:
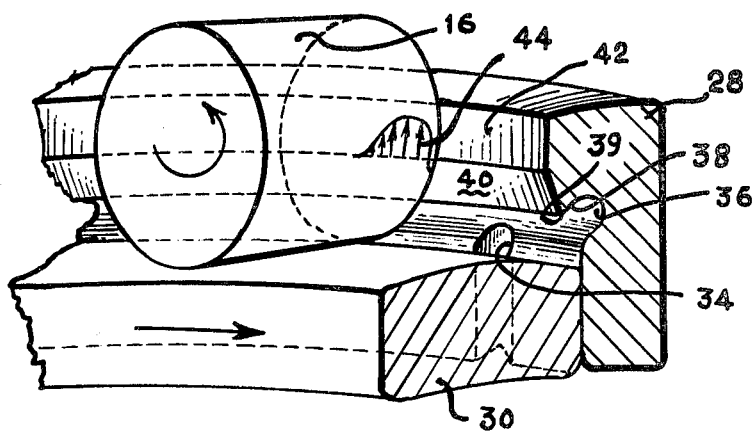
Figure 3:
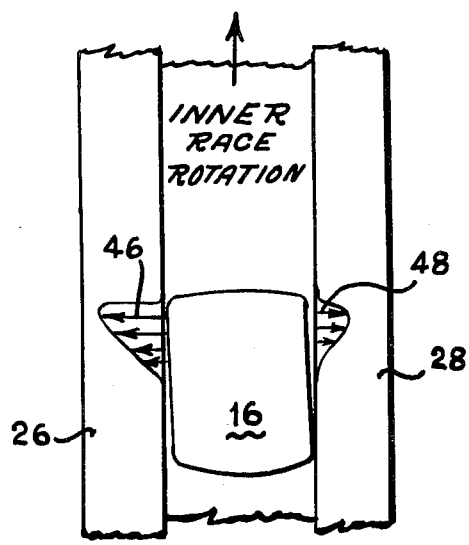
Figure 4:
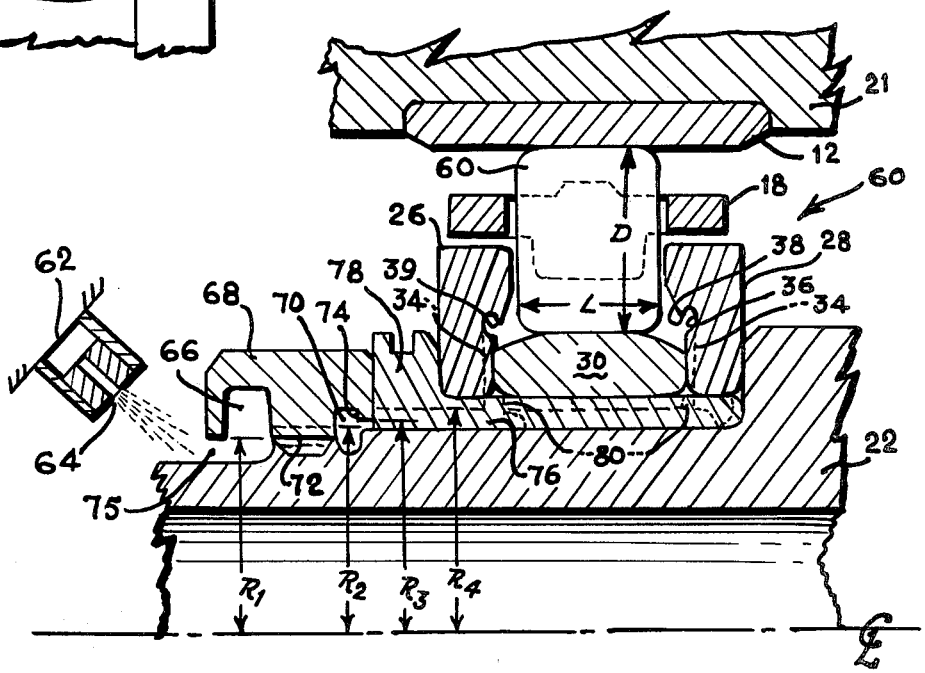

FIG. 1 is a cross-sectional view of the roller bearing of this invention shown in conjunction with a rotating shaft and in partially segmented fashion;

FIGS. 2 and 3 of the drawing represent the development of damping or centering forces by the guide rail on the roller bearing of this invention; and FIG. 4 is a cross-sectional view of an alternate embodiment of the roller bearing of this invention shown in partially segmented fashion.

DESCRIPTION OF THE PREFERRED EMBODIMENTS

Reference is now made to FIG. 1 of the drawing which illustrates in a cross-sectional view the roller bearing 10 of this invention. Roller bearing 10 is made up of a annular outer ring 12, an inner ring 14 and a plurality of rollers 16 held in place by a cage structure 18. Outer ring 12 may be either stationary or rotatable but is illustrated in FIG. 1 of the drawing as being fixedly secured to a housing 21 or the like. Inner ring 14 is made up of three separate elements, the details of which are set forth hereinbelow.

Ring 14 is also of an annular configuration and is secured upon a rotatable shaft 22 so as to be rotatable therewith. Inner ring 14 is preferably press fit upon shaft 22 and held in place by any suitable retainer element 24. Interposed between the inner ring 14 and outer ring 12 are the plurality of spaced-apart, cylindrical rollers 16 (two of which being shown in FIG. 1 of the drawing). Rollers 16 are held in spaced-apart relation by cage structure 18 which fits upon the plurality of rollers 16 in a conventional manner.

As part of this invention inner ring 14 is made up of three separable elements; a pair of guide rails 26 and 28 and an inner raceway 30. Since guide rails 26 and 28 are separable, it is possible to design roller bearing 10 such that guide rails 26 and 28 encompass as much as 60% of the roller diameter, D. In addition rollers 16 are fabricated such that their length, L, to roller diameter, D, ratio is approximately 0.87. Such a relationship minimizes any gyro induced guide rail forces.

Under conditions of incipient failure of bearing 10 such as spalling or element instability, wear and possibly vibration will occur prior to catastrophic failure. The high guide rails 26 and 28 which contain rollers 16 therefore offer substantially more time before the fracture of cage 18 and/or eventual loss of shaft centering occurs. Furthermore, since inner ring 14 is made of separable elements, cage 18 can be manufactured of a material having greater flexibility than the other elements of the bearing 10. Further, guide rails 26 and 28 do not have to be made of the same material and hardness as inner raceway 30 thereby resulting in lower machining costs during the manufacture of bearing 10 of this invention.

Forming another essential part of this invention is the novel lubricant distribution system 32 of bearing 10. In this invention lubrication system 32 is formed as part of each of the guide rails 26 and 28. The lubrication system 32 is made up of identical structure in each guide rail 26 and 28 and, therefore, for purposes of ease of understanding of the lubrication system 32 of this invention the following description will have identical elements in each guide rail 26 and 28 being identified with the same reference numerals.

As illustrated in FIGS. 1 and 2 of the drawing, each guide rail 26 and 28 has located therein a plurality of radial slots 34 (one of which being shown clearly in FIG. 2 of the drawing) interconnected with an annular channel 36 formed within each guide rail 26 and 28 concentric with the bore of each guide rail 26 and 28, respectively. Channel 36 terminates in a weir 38 having a flat or rounded lip 39 and which is also formed concentric with the bore of its respective guide rail 26 or 28. A slight tapered portion 40 is formed adjacent lip 39 of weir 38.

Any suitable lubricant such as oil is directed into the radial slots 34 by way of a plurality of radial holes 50 shown in FIG. 1 of the drawing located in shaft 22. Holes 50 are aligned with a plurality of lubricating jets 52 situated within the center of shaft 22. The targeting of the oil jets 52 to avoid splash depends upon the rotation speed of shaft 22. As the lubricant enters the guide rail radial slots 34, even distribution (360° within the channel 36) is maintained by centrifugal force on the lubricant.

Even distribution of the lubricant over lip 39 of weir 38 is obtained by the concentricity of the lip with the bore of the guide rails 26 and 28. The tapered portion 40 adjacent lip 39 of weir 38 allows for a buildup of pressure to take place at the face 42 of each guide rail 26 or 28. The pressure buildup is illustrated by arrows 44 in FIG. 2 of the drawing. FIG. 3 of the drawing illustrates how the pressure indicated by arrows 46 increases as the leading edge of roller 16 is pressed against guide rail 26. As this action takes place the opposite side of roller 16 drops in pressure as indicated by arrows 48 since the gap between roller 16 and guide rail 28 is increased.

Reference is now made to FIG. 4 of the drawing which shows an alternate embodiment of this invention in the form of roller bearing 60. In this embodiment of the invention, since the majority of the elements of roller bearing 60 are identical to those of roller bearing 10 illustrated in FIG. 1 of the drawing, identical numerals will be utilized to designate the same elements in FIGS. 1 and 4 of the drawing.

The major difference between roller bearing 60 and roller bearing 10 is the manner in which the lubricant is introduced into the radial slots 34. In the embodiment of roller bearing 60 illustrated in FIG. 4 of the drawing, lubricant in the form of oil, for example, is provided from a supply 62 which terminates in an orifice 64 thereby jetting the oil lubricant against the side of shaft 22. Shaft 22 in turn reflects the lubricant into a reservoir 66 formed within a retaining nut 68. A second reservoir 70 is situated within nut 68 adjacent reservoir 66 and is interconnected with reservoir 66 by a plurality of longitudinal or axially extending grooves 72. Reservoir 70 terminates in a weir 74 over which the lubricant spills in a manner described below.

As clearly depicted in FIG. 4 of the drawing, it should be realized that the entrance or inlet 75 of reservoir 66 is of a smaller diameter (illustrated as radius $R_1$) than the diameter (illustrated as radius $R_2$) of groove 72 while the diameter of groove 72 is smaller in turn than the diameter (illustrated by radius $R_3$) of the weir 74. This leads to a stepped up configuration which introduces lubricant into a plurality of axially extending slots or grooves 76 situated within a spacer 78. Spacer 78 is interposed between guide rails 26 and 28, raceway 30 retainer nut 68 and shaft 22. It therefore follows that the diameter (illustrated as radius $R_4$) of groove 76 is larger than the diameter of weir 74.

A plurality of radially extending holes 80 are formed within spacer 78 thereby interconnecting grooves 76 with the radially extending slots 34 in guide rails 26 and 28. Thereafter, actual lubrication of rollers 16 can be accomplished in a similar manner to that depicted with respect to roller bearing 10 and illustrated in FIGS. 1-3 of the drawing. A lubrication system as depicted with bearing 60 of FIG. 4 may be preferable to that illustrated with respect to bearing 10 in certain instances, for example, in which shaft 22 cannot accommodate a centrally located lubricating arrangement.

With the use of this invention, as depicted with either embodiment, roller skew angle and end clearance tolerances are greatly reduced. Furthermore, an even distribution of lubricant and coolant by a centrifugally fed weir built into the guide rails 26 and 28 of separable inner ring 14 can be obtained.

Although this invention has been described with reference to particular embodiments, it will be understood that this invention is also capable of further and other embodiments within the spirit and scope of the appended claims.

I claim:

1. A roller bearing comprising an outer ring, an inner ring, a plurality of rollers interposed between said inner ring and said outer ring and means interposed between said inner ring and said outer ring for supporting said rollers therebetween;

said inner ring being made of three separable elements in the form of a pair of guide rails and an inner raceway interposed therebetween, each of said guide rails having means formed therein for distributing lubricant to said rollers;

said lubricant distributing means in each of said guide rails being made up of an annular channel formed within an inner face of each of said guide rails and a weir connected to each of said channels, said weir in each of said guide rails being located adjacent said rollers, each of said guide rails having a portion of said inner face situated adjacent said rollers and tapering down to said weir, and a plurality of radially extending slots formed within said guide rails interconnecting said channels to a lubricant source whereby even distribution of said lubricant from said channels is maintained by centrifugal force on said lubricant during bearing operation.

2. A roller bearing as defined in claim 1 wherein said roller supporting means, said guide rails and said inner raceway are made of materials having different hardness.

3. A roller bearing as defined in claim 1 wherein each of said guide rails has a side thereof situated adjacent said rollers, said sides adjacent said rollers being of a predetermined height and said predetermined height being approximately equal to 60% of the diameter of said rollers.

4. A roller bearing as defined in claim 1 wherein said weir has a lip formed thereon.

5. A roller bearing as defined in claim 1 wherein said inner ring has a bore of preselected size so as to matingly engage the outer surface of a shaft, and said lubricant distribution system further comprising a plurality of radial extending holes located within said shaft adjacent said radial extending slots in said guide rails and means situated within said shaft for feeding said lubricant into said radial extending holes.

6. A roller bearing as defined in claim 5 wherein said weir has a lip formed thereon.

7. A roller bearing as defined in claim 6 wherein said lip of said weir is formed concentric with said bore of said inner ring.

8. A roller bearing comprising an outer ring, an inner ring, a plurality of rollers interposed between said inner ring and said outer ring and means interposed between said inner ring and said outer ring for supporting said rollers therebetween;

said inner ring being made of three seperable elements in the form of a pair of guide rails and an inner raceway interposed therebetween, each of said guide rails having means formed therein for distributing lubricant to said rollers;

said lubricant distributing means being made up of (a) an annular channel formed within an inner face of each of said guide rails, said channel terminating in a weir adjacent said rollers, each of the guide rails having a portion of said inner face situated adjacent said rollers and tapering down to said weir, and a plurality of radially extending slots formed within said guide rails interconnecting said channels to a lubricant source, (b) annular means interposed between said inner ring of said bearing and a shaft upon which said bearing is mounted for spacing said inner ring from said shaft, said spacing means having means therein for feeding lubricant to said radial slots in said guide rails, (c) annular means juxtaposed said spacing means for fixedly securing said bearing to said shaft, and said bearing securing means having means therein for storing said lubricant received from said lubricant source and feeding said lubricant to said lubricant feeding means in said spacing means;

whereby even distribution of said lubricant from said channel is maintained by centrifugal force on said lubricant during bearing operation.

9. A roller bearing as defined in claim 8 wherein said lubricant storing means comprises at least one reservoir, said reservoir having an inlet and an outlet, said inlet being formed between said bearing securing means and said shaft and having a preselected outer diameter, said outlet being formed between said bearing securing means and said shaft and having a preselected outer diameter, said preselected outer diameter of said inlet being less than said preselected outer diameter of said outlet.

10. A roller bearing as defined in claim 8 wherein said lubricant feeding means in said spacing means comprises at least one axially extending slot adjacent said shaft and having a preselected outer diameter, said preselected outer diameter of said slot in said spacing means being larger than said preselected diameter of said outlet of said reservoir, and a plurality of radially extending holes formed in said spacing means interconnected to said axially extending slot, said radial holes being aligned axially with said radially extending slots in said guide rails in order to feed lubricant thereto.

11. A roller bearing as defined in claim 8 wherein said lubricant storing means comprises a first reservoir and a second reservoir, said reservoirs being interconnected by a slot formed between said bearing securing means and said shaft, said slot having a preselected outer diameter, said first reservoir having an inlet, said inlet being formed between said bearing securing means and said shaft and having a preselected outer diameter, said preselected outer diameter of said inlet being less than preselected outer diameter of said slot, said second reservoir having an outlet in the shape of a weir formed between said bearing securing means and said shaft, said outlet having a preselected outer diameter, said preselected outer diameter of said second reservoir being greater than said preselected outer diameter of said slot.

12. A roller bearing as defined in claim 11 wherein said lubricant feeding means in said spacing means comprises at least one axially extending slot adjacent said shaft and having a preselected outer diameter, said preselected outer diameter of said slot in said spacing means being larger than said preselected diameter of said outlet of said reservoir, and a plurality of radially extending holes formed in said spacing means interconnected to said axially extending slot, said radial holes being aligned with said radially extending slots in said guide rails in order to feed lubricant thereto.

* * * * *